United States Patent
Zhao

(10) Patent No.: US 8,954,971 B2
(45) Date of Patent: Feb. 10, 2015

(54) DATA COLLECTING METHOD, DATA COLLECTING APPARATUS AND NETWORK MANAGEMENT DEVICE

(75) Inventor: Rui Zhao, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 290 days.

(21) Appl. No.: 13/519,192

(22) PCT Filed: Jul. 22, 2010

(86) PCT No.: PCT/CN2010/075391
§ 371 (c)(1),
(2), (4) Date: Jun. 26, 2012

(87) PCT Pub. No.: WO2011/079614
PCT Pub. Date: Jul. 7, 2011

(65) Prior Publication Data
US 2012/0297393 A1    Nov. 22, 2012

(30) Foreign Application Priority Data
Dec. 30, 2009    (CN) .......................... 2009 1 0261698

(51) Int. Cl.
G06F 9/46    (2006.01)
G06F 9/48    (2006.01)

(52) U.S. Cl.
CPC .................................. *G06F 9/4843* (2013.01)
USPC ....................................................... 718/102

(58) Field of Classification Search
None
See application file for complete search history.

(56) References Cited

U.S. PATENT DOCUMENTS

| 5,285,494 A | 2/1994 | Sprecher et al. |
| 7,590,620 B1 * | 9/2009 | Pike et al. ............................. 1/1 |
| 2010/0125847 A1 * | 5/2010 | Hayashi ........................ 718/102 |

FOREIGN PATENT DOCUMENTS

| CN | 1508682 A | 6/2004 |
| CN | 101001174 A | 7/2007 |
| CN | 101262367 A | 9/2008 |
| JP | H11120149 A | 4/1999 |
| JP | 2007264794 A | 10/2007 |

OTHER PUBLICATIONS

International Search Report for PCT/CN2010/075391 dated Sep. 20, 2010.

* cited by examiner

*Primary Examiner* — Mengyao Zhe
(74) *Attorney, Agent, or Firm* — Ling Wu; Stephen Yang; Ling and Yang Intellectual Property

(57) ABSTRACT

The present invention provides a data collection method and apparatus and a network management device. The method includes: a network management device collecting data files to be processed reported by a network element device; assigning the data files to be processed as a plurality of tasks; adding the assigned tasks into a task queue and extracting tasks from the task queue one by one for processing. According to the present invention, the task work load can be automatically adjusted according to the computer configuration and parameter configuration, and the maximum efficiency of data processing can be achieved under different scenarios.

4 Claims, 2 Drawing Sheets

DATA COLLECTING METHOD, DATA COLLECTING APPARATUS AND NETWORK MANAGEMENT DEVICE

TECHNICAL FIELD

The present invention relates to a configurable and schedulable data collection method and apparatus and a network management device.

BACKGROUND OF THE RELATED ART

The concepts and drawbacks of two existing data collection methods are as follows.

1. All the data files are reported to a certain directory designated by manager by the person being managed, and all the data files under this directory are collected and parsed during the data collection.

The collection and parse procedures for different products are different, which can be generally divided into two types:

1) single thread running: the processing efficiency thereof is low, once abnormality occurs to the thread, it cannot ensure all the data to be processed;

2) multi-thread running: resource competition of multiple threads may appear, the overhead of the synchronization method will be increased during this competition, and the efficiency is reduced.

2. The data files generated by different persons being managed are reported to the designated directory for this person being managed in the manager, and the data files under all the directories are collected and parsed.

The directory can be divided into multiple levels, and there can be a plurality of parallel subdirectories in each directory level. All the data are placed on the leaf directory (i.e. directory for person being managed), each directory for person being managed is stored in different upper level directory according to a certain rule; and so on, the upper level directory can also be stored in an further upper level directory according to a certain rule.

The collection and parse procedures of different products are different, which can also be generally divided into two types:

1) single thread running: the processing efficiency is also low, and it will cause the execution of magnetic disk IO operation to occupy a large amount of time and resources for processing when the single thread access directory layer is deep;

2) multi-thread running: each thread being responsible for the processing under a non-leaf directory may cause the working loads of each thread to be uneven; and multiple threads being responsible for a non-leaf directory may further cause thread resource waste under directories with less data in addition to forming competition.

In addition, the above two existing concepts also have the following drawbacks:

the directory for data storage becomes the basis for processing thread creation, startup and stopping, which will cause problems that the working loads of the processing threads are uneven and monitoring cannot be carried out uniformly.

SUMMARY OF THE INVENTION

The present invention provides a data collection method and apparatus and a network management device, in which the task work load can be automatically adjusted according to the computer configuration and parameter configuration to achieve the maximum efficiency of data processing under different scenarios.

In order to solve the above technical problem, the present invention provides a data collection method, comprising:

a network management device collecting data files to be processed reported by a network element device;

assigning the data files to be processed as a plurality of tasks; and adding the plurality of tasks into a task queue and extracting tasks from the task queue one by one for processing.

Preferably, the above method has the following features: the step of assigning the data files to be processed as a plurality of tasks comprises:

evaluating quantity or capacity of the data files to be processed;

evaluating local calculation ability;

obtaining local configuration parameters;

calculating task payload according to the quantity or capacity of the data files to be processed, the local calculation ability and the configuration parameters; and assigning the data files to be processed as a plurality of tasks based on the task payload.

Preferably, the above method has the following features: the local calculation ability comprises: local CPU processing speed and memory capacity.

Preferably, the above method has the following features: the configuration parameters comprises: the number of threads and the maximum activation time of the threads.

The present invention also provides a network management device, comprising:

a data collection apparatus, which is configured to: obtain data files to be processed reported by a network element device; assign the data files to be processed into a plurality of tasks; add the plurality of tasks into a task queue, and extract tasks from the task queue one by one for processing.

Preferably, the above network management device has the following features:

the data collection apparatus is configured to assign the data files to be processed into a plurality of tasks by way of the following manner: evaluating quantity or capacity of the data files to be processed; evaluating local calculation ability; obtaining local configuration parameters; calculating task payload according to the quantity or capacity of the data files to be processed, the local calculation ability and the configuration parameters; and assigning the data files to be processed as a plurality of tasks based on the task payload. Preferably, the above network management device has the following features: the local calculation ability comprises: local CPU processing speed and memory capacity.

Preferably, the above network management device has the following features: the configuration parameter comprises: the number of threads and the maximum activation time of the threads.

The present invention also provides a data collection apparatus, comprising:

a task scheduling module being configured to obtain data files to be processed reported by a network element device, assign the data files to be processed into a plurality of tasks, and send the plurality of tasks to a thread pool module; and the thread pool module being configured to add the plurality of tasks received into a task queue, and extract tasks from the task queue one by one for processing.

Preferably, the above data collection apparatus has the following features: the task scheduling module comprises:

a data evaluation unit being configured to collect data files to be processed reported by a network element device, evaluate quantity or capacity of the data files to be processed, and send the evaluated quantity or capacity to a calculation unit;

a calculation ability evaluation unit being configured to evaluate local calculation ability and send the evaluated local calculation ability information to the calculation unit;

a configuration parameter unit being configured to obtain configuration parameters and send the obtained configuration parameters to the calculation unit;

the calculation unit being configured to calculate task payload according to the quantity or capacity of the data files to be processed, the local calculation ability and the configuration parameters, and send the calculated task payload to a task assignment unit; and the task assignment unit being configured to, after receiving the task payload, assign the data files to be processed as a plurality of tasks based on the task payload, and send the plurality of tasks to the thread pool module.

Preferably, the above data collection apparatus has the following features: the local calculation ability comprises: local CPU processing speed and memory capacity.

Preferably, the above data collection apparatus further comprises a configuration item module being configured to define configuration parameters, wherein the configuration parameters comprises: the number of threads and the maximum activation time of the threads; the configuration parameter unit being configured to obtain the configuration parameters from the configuration item module.

The data collection method and apparatus and network management device provided by the present invention have the following beneficial effects:

1. the task work load can be automatically adjusted according to the computer configuration and parameter configuration, and the maximum efficiency of data processing can be achieved under different scenarios;

2. when the task scheduling module divides tasks, it will not cause the working ranges of different tasks to be overlapped, eliminating the possibility of resource competition, and improving the task processing efficiency;

3. the content of a task is merely limited to the access to one level directory, improving the IO operation efficiency of entering or exiting the directory for the magnetic disk;

4. the configuration file manages the scale of the thread pool, which can improve the efficiency of data collection function without losing system efficiency;

5. the configuration file manages the activation time of the thread, reducing the possibility of abnormality occurring during the long time running of the thread;

6. although some processing time will be lost due to a large amount of file operations during task scheduling, the loss brought thereby is far less than the time saved by the subsequent processing;

7. the task scheduling module can assign tasks rationally according to the computer configuration in real time, avoiding the situations that the working load of the computer is over large or the computer is not fully utilized.

PREFERRED EMBODIMENTS OF THE PRESENT INVENTION

Hereinafter, the technical solution provided by the embodiments of the present invention will be further described in conjunction with the accompanying drawings. It shall be understood that the preferred embodiments here described are merely for explaining the present invention but not as a limit.

Figure 1:
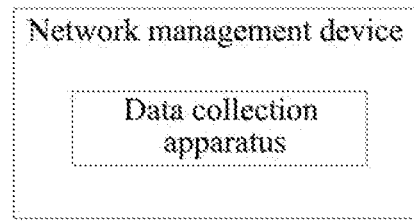
FIG. 1 is a schematic diagram of a network management device according to the embodiments of the present invention.

FIG. 1 is a schematic diagram of a network management device according to the embodiments of the present invention, and as shown in FIG. 1, the network management device according to this embodiment includes a data collection apparatus, which has the following functions:

obtain data files to be processed (which may refer to parsing the data file, and may also refer to forwarding the data files to the upper level of the network administrator) reported by a network element device; evaluate the quantity or capacity of the data files to be processed, calculate task payload according to the local calculation ability and configuration parameter, and then assign the data files to be processed into a plurality of tasks according to the task payload. Various assigned tasks are added into a task queue, then they are extracted from the task queue one by one for execution, and the content of each extracted task is a part of data files to be processed.

Figure 2:
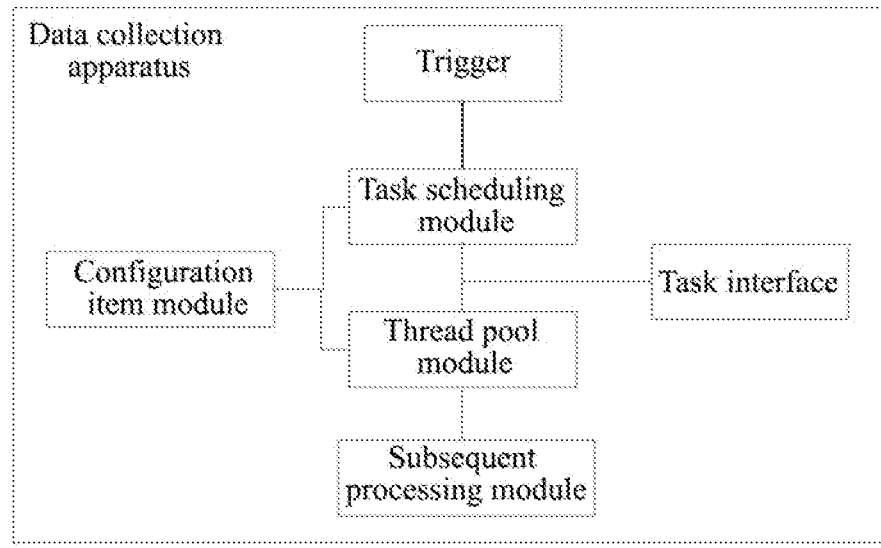
FIG. 2 is a schematic diagram of a data collection apparatus according to the embodiments of the present invention.

FIG. 2 is a schematic diagram of a data collection apparatus according to the embodiments of the present invention, and as shown in FIG. 2, the data collection apparatus in this embodiment includes: a trigger, a task scheduling module, a thread pool module, a subsequent processing module and a configuration item module, wherein the main function of each module is as follows.

The trigger is mainly used for triggering the task scheduling module to start working.

The task scheduling module is used for collecting data files to be processed, such as collecting all the data files to be processed under all the leaf directories under a non-leaf directory, dynamically adjusting the working load of each thread according to the quantity/capacity of the data file, the computer configuration (such as local calculation ability) and the configuration item parameters extracted from the configuration item module, assigning a task, and sending the assigned task to the thread pool module.

The task scheduling module can automatically adjust the task work load according to the computer configuration and the parameter configuration and achieve the maximum efficiency of the data processing under different scenarios; when the task scheduling module assigns tasks, it will not cause the working ranges of different tasks to be overlapped, which eliminates the possibility of resource competition, and improves the task processing efficiency; the assigned tasks are: the content of a task is merely limited to the access to one level directory (i.e. leaf directory, referring to a plurality of directories on the same level and belonging to the same parent directory), which improves the Io operation efficiency of entering or exiting the directory for the magnetic disk.

The thread pool module consists of a plurality of activated threads processing the tasks and a task queue, the thread pool module adds the received task into the task queue, and the activated thread obtains a task from the task queue for processing. The activated thread firstly extracts a task from the head of the task queue, obtains the information about the data file to be processed from the task, and then processes the data file according to the corresponding information. The processing can include: parsing the data file, forwarding the data file, but not limited to these two processing modes. If the data file processing result during task execution is not the end of the data flow or it needs further processing, then the task execution result has to be sent to the subsequent processing module for further processing.

The configuration item module provides the definition of the data collection function related parameter by way of an XML (Extensible Markup Language) file or in the code. The configuration item includes: the number of threads of the thread pool module, the maximum activation time of the threads, scheduling according to the quantity or capacity of the file, etc.

The configuration item module manages the scale of the thread pool, which can improve the efficiency of data collection function without losing system efficiency; it provides a "the number of threads" parameter by way of the configuration item, and selects how many activated processes can be generate, i.e. the scale of the thread pool, according to this parameter during the initialization of the thread pool.

The configuration item module manages the activation time of the thread, reducing the possibility of abnormality occurring during the long time running of the thread. In particular, the "the activation time of the thread" parameter can be provided by way of the configuration item. This parameter decides the maximum running time of a thread. For example, this parameter is set as 1 minute, then the maximum time for a thread to execute a task is 1 minute, and the thread will automatically stop the execution of the task when it exceeds 1 minute and adds the data file the processing of which is not completed in the task into the task queue. In order to avoid increasing possibilities of thread abnormality due to the continuous long time running of the thread, this parameter is set to reduce the possibility of thread abnormality.

The subsequent processing module provides the subsequent processing operations, such as operation of writing into a database and forwarding operation. It can also be designed as thread pool plus data queue according to the processing capacity, i.e. employing the operation mode in the manner of one thread pool and a data queue (herein, the thread pool and data queue do not refer to the above thread pool and data queue but refer to a general concept); however, if the processing capacity is small, then it can be designed as a single thread plus data queue. It shall be noted not to design it with the thread in the thread pool as synchronization manner. The subsequent processing operation may include writing the data into a database or data forwarding operation, etc. but not limited to these two types.

Figure 3:
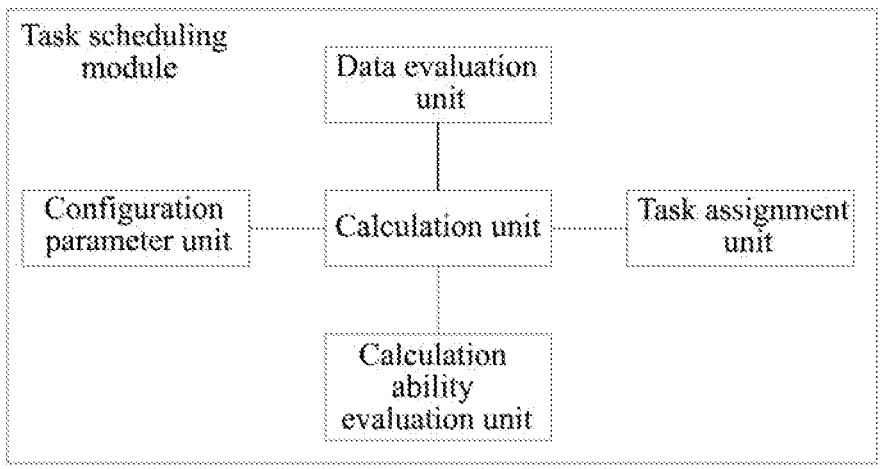
FIG. 3 is a schematic diagram of a task scheduling module according to the embodiments of the present invention.

The structure of the task scheduling module in the data collection apparatus in this embodiment is as shown in FIG. 3, including: a data evaluation unit, a calculation unit, a calculation ability evaluation unit, a configuration parameter unit and a task assignment unit.

The data evaluation unit is configured to obtain data files to be processed, such as collecting the data files under all the leaf directories under a non-leaf directory, evaluating the data files to be processed, such as evaluating the quantity or capacity of the data files, and send the evaluated quantity and/or capacity of the data files to the calculation unit.

The calculation ability evaluation unit is configured to evaluate the local calculation ability, such as the CPU processing speed of the computer, the memory capacity, etc., and send the evaluated local calculation ability information to the calculation unit.

The configuration parameter unit is configured to extract a configuration parameters from the configuration item module, such as the number of threads, the maximum activation time of the threads, etc., and send the configuration parameter or the operated configuration parameter to the calculation unit.

The calculation unit is configured to calculate task payload according to the quantity and/or capacity of the data files evaluated by the data evaluation unit, the local calculation ability evaluated by the calculation ability evaluation unit and the configuration parameter provided by the configuration parameter unit, and send the calculated task payload to the task assignment unit.

The task assignment unit is configured to assign all the data files to be processed under all the leaf directories as a plurality of tasks according to the task payload, and send the assigned tasks to the thread pool module. Each sub-task is only responsible for the collection and parse work of a subset of all the collected leaf directories.

The data evaluation and task decomposition can be performed according to two dimensions of quantity or capacity.

In the network management device and data collection apparatus according to the embodiments of the present invention, the data files to be processed under all the leaf directories under a non-leaf directory and a task is assigned, the work load of each task is dynamically adjusted according to the quantity/capacity of the data files to be processed, the computer configuration (i.e. local calculation ability) and configuration item parameter, which solves the problem that the work load of each thread is uneven, also solves the problem that the work load of the computer is over large or it is not fully utilized, and also solves the problem that the work ranges of multiple processes under the same non-leaf directory are overlapped to form competition; moreover, the decomposed task merely operates the leaf directories, avoiding frequent access of files and entering or exiting a plurality of levels of directories, solving the problem that the efficiency of the magnetic IO operation is low. The mode used by data processing is the thread pool plus task queue mode and is managed by the configuration item.

All the processing threads can be monitored uniformly, which solves the problem that all the processing threads cannot be managed uniformly; and the number of parsing threads and the maximum activation time thereof can be adjusted according to different scenarios, reducing the increasing possibility of abnormality occurrence due to the long time running of the thread, and achieving the maximum processing efficiency under the premise of ensuring the accuracy rate.

Although some processing time will be lost due to a large amount of file operations during task scheduling, the loss brought thereby is far less than the time saved by the subsequent processing.

Figure 4:
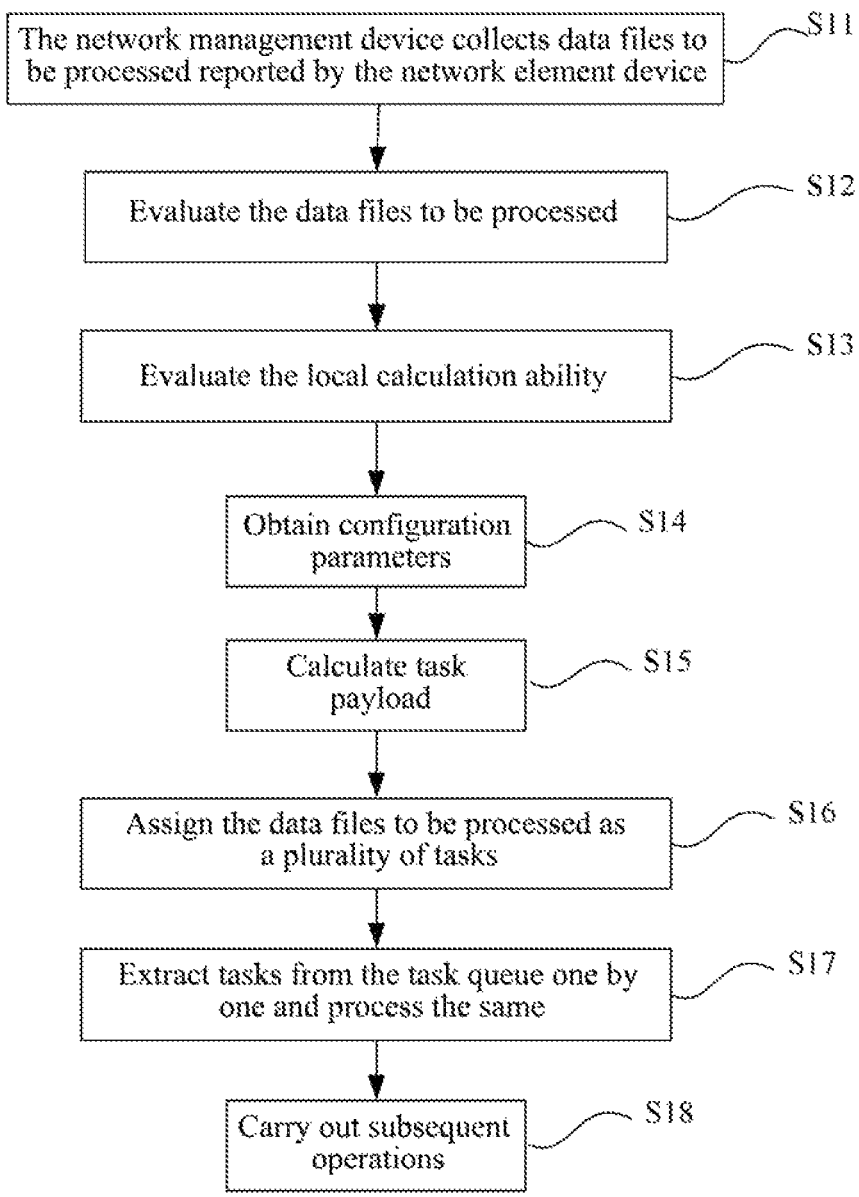
FIG. 4 is a flowchart of a data collection method according to the embodiments of the present invention.

FIG. 4 is a flowchart of a data collection method according to the embodiments of the present invention, and as shown in FIG. 4, the data collection method in this embodiment includes the following steps.

S1, A network management device collects data files to be processed reported by a network element device.

After the trigger triggers the task scheduling module to start working, the task scheduling module collects leaf directories to be processed under each non-leaf directory, and the data files to be processed reported by various network element devices are stored under these leaf directories.

S12, the data files to be processed are evaluated.

The data files under the leaf directory are evaluated, for example, the quantity and/or capacity of the data files can be evaluated.

S13, the local calculation ability is evaluated.

The local calculation ability mainly includes: CPU processing speed of the computer, memory capacity, etc.

S14, a configuration parameter is obtained.

The configuration parameter mainly includes: the number of threads, the maximum activation time of the threads, etc.

Steps S12 to S14 have no order limit.

S15, the task payload is calculated.

The task payload of each thread is calculated on the basis of the parameters obtained from steps S12 to S14, and the calculation manner of the task payload is as follows.

1) The total data CPU processing time is calculated.

The total data CPU processing time is in particular equal to the total quantity or total capacity of the data files to be processed divided by the CPU processing speed.

2) The processing batch is calculated.

The quotient of the total data CPU processing time divided by the product of the number of threads and the maximum activation time, and the quotient of the total capacity of the data files to be processed divided by the memory capacity are firstly calculated, and then the bigger one from the two quotient is taken as the processing batch, and the expression is as follows:

processing batch=Max (the total data CPU processing time/(the number of threads*the maximum activation time), the total capacity of the data/memory capacity), wherein, Max represents to take the maximum.

3) The task payload is calculated.

The task payload of each thread is the total data capacity divided by the processing batch and then divided by the number of threads, and the expression is as follows:

the load of each thread=the total data capacity/the processing batch/the number of threads.

Of course, the above rule may not be suitable for every scenario, and other calculation methods are also suitable.

S16, the data files to be processed are assigned as a plurality of tasks based on the task payload, and each assigned task is added into the task queue.

In this case, the contents of the task are merely parsing the data files under the leaf directories covered by this task.

S17, the tasks are extracted from the task queue one by one and processed.

After having received an activation notification, the thread pool extracts tasks from the task queue one by one and processes the same, and the task processing result can be sent to the subsequent processing module.

During the task processing, the processing on the data file can be parsing the data file, and the execution result is data to be written into the database or data to be forwarded.

S18, subsequent operations are performed.

The threads of the subsequent processing module continuously extract data from the data queue and carries out subsequent operations; if there is no data in the data queue, the thread will try again after hibernating for some time.

The particular embodiments involved in steps S11 to S18 in this method are not only limited to scenarios such as network administrator performance, alerting, inverse construction, but all the scenarios which need to collect data can use them. Hereinafter, the data collection embodiments under three scenarios of network administrator performance, alerting, and inverse construction will be introduced respectively.

Embodiment I

As to collection of performance data by network administrator: the network element device reports the performance data files to the network management device, and the data collection apparatus in the network management device collects the performance data and writes the same into the database.

Various modules are constructed in the data collection apparatus in this embodiment, which is in particular as follows.

A. Construct a Collection Trigger Module.

The collection trigger module can be achieved by a timer and is used for awaking the task scheduling module to start working.

B. Construct a Configuration Item Module.

In particular, an XML configuration file and the parse class thereof are defined, and the characteristics in this embodiment relate to the following relevant parameters: the number of threads in the thread pool module, the maximum thread activation time and the data evaluation decomposition granularity (quantity or capacity), and provide the parameter collection function.

In the actual application, all the parameters are written into the XML configuration file, and these parameters needs to be added into the software by way of the parse class.

C. Construct the Task Scheduling Module.

1) the task scheduling module uses the number of threads of the configuration item and the maximum activation time;

2) a data evaluation unit is constructed and configured to evaluate the total capacity of the data files;

3) a calculation ability evaluation unit is constructed and configured to evaluate the CPU processing speed and memory capacity of the computer;

4) a calculation unit is constructed and configured to calculate the task payload of the process according to the corresponding calculation rule and assign all the collected data files to each task according to the task payload of the thread; and the running result is the assigned task (i.e. implemented task interface), and the assigned tasks are added into the task queue in the thread pool.

D. Define and Implement the Task Interface

The function of processing the performance data file under the network element is implemented in the task interface.

The task interface can further add the result after having parsed the data file into the data queue of the subsequent processing module, and the processing result is the subsequent processing data. The subsequent processing data actually refers to the result after the task parses the data file, and it may need further procedure so as to be called as subsequent processing data.

E. Construct a Thread Pool Module

The thread pool has to use the "the number of threads of the thread pool module", the recommendation value of which is 20, and "the maximum thread activation time", the recommendation value of which is 10 min, of the configuration item.

The thread pool module can add the assigned tasks into the task queue; then extract tasks from the task queue one by one, process the same, and output the processed tasks.

Preferably, if some tasks need subsequent processing, such as operation of being written into the database, then the thread pool module outputs the processed task to the subsequent processing module.

F. Construct the Subsequent Processing Module

Define a data queue and construct a data cache mechanism; and the data queue is used for storing data which need subsequent processing.

Construct a processing process, which process is an ever running process and extracts data from the data queue for processing; if it is an operation of writing into the database, the execution of this process can store the data into a database relevant table by way of the storage process of the database.

Embodiment II

As to the processing of the network management device constructing data inversely: the network management device initiates an inverse construction operation toward a plurality of network element devices, the network element device reports the inverse construction data files to the network management device, and the data collection module in the network management device collects the inverse construction data and writes the same into the database.

In this case, inverse construction refers to reporting the configuration data on the network element device to the network management device in the manner of FTP (file transfer protocol), and the network management device collects these configuration data and finally writes the same into the database. The inverse construction operation includes: the network management device issues a command to the network element device, and the network element device reports the configuration data to the network management device, and the network management device collects the configuration data and writes the same into the database.

The basic method of this embodiment is similar to that of embodiment I, and the difference between it and that of embodiment I lies in:

a. the configuration item module employs quantity evaluation and task decomposition, where, the reason is that it is not interesting how big the capacity is during inverse construction, but is only interesting how many configuration data need to be collected;

b. the data evaluation unit in the task scheduling module returns the total quantity of the data files;

c. the trigger condition in the trigger module is the inverse construction operation instead of timer.

Embodiment III

As to the collection of the network management alarm synchronization data: the network management device initiates an alarm synchronization operation toward a plurality of network element devices, the network element device reports the alarm synchronization data to the network management device, and the data collection module in the network management device collects the alarm synchronization data and writes the same into the database.

The basic method of this embodiment is similar to that of embodiment I, and the difference between it and that of embodiment I lies in:

a. the configuration item module employs quantity evaluation and task decomposition;

b. the data evaluation unit in the task scheduling module returns the total quantity of the data;

c. the trigger condition in the trigger module is the alerting synchronization operation instead of timer.

The method in this embodiment is suitable for all the "manager-person being managed" model environments, and as long as there are data to be reported to the manager by the person being managed, this method can be used.

Above description is only to illustrate the preferred embodiments but not to limit the present invention. Various alternations and changes to the present invention are apparent to those skilled in the art. The scope defined in claims shall comprise any medication, equivalent substitution and improvement within the spirit and principle of the present invention.

Industrial Applicability

As compared to the related art, the present invention eliminates the possibility of resource competition, improves the task processing efficiency, improves the IO operation efficiency of entering or exiting the directory for the magnetic disk, improves the data collection function efficiency without losing system efficiency, reduces the possibility of abnormality appearing during the long time running of the thread, and avoids the situation that the work load of the computer is over large or it is not fully utilized.

I claim:

1. A data collection method, comprising:
a network management device collecting data files to be processed reported by a network element device;
assigning the data files to be processed as a plurality of tasks; and
adding the plurality of tasks into a task queue and extracting tasks from the task queue one by one for processing;
wherein the step of assigning the data files to be processed as a plurality of tasks comprises:
evaluating a total quantity or capacity of the data files to be processed;
evaluating local calculation ability;
obtaining local configuration parameters;
calculating task payload of each thread according to the quantity or capacity of the data files to be processed, the local calculation ability and the configuration parameter; and
assigning the data files to be processed as the plurality of tasks based on the task payload;
wherein the local calculation ability comprises: local CPU processing speed and memory capacity, and the configuration parameter comprises: a number of threads and maximum activation time of the threads;
wherein the task payload of each thread is equal to the total data quantity or capacity divided by a number of processing batch and then divided by the number of threads;
wherein the number of processing batch=Max (the total data CPU processing time/(the number of threads*the maximum activation time), the total capacity of the data/memory capacity), wherein, Max represents to take a maximum;
wherein the total data CPU processing time is equal to the total quantity or total capacity of the data files to be processed divided by the CPU processing speed.

2. A network management device, comprising a processor, and a computer storage media storing instruction that, when executed, causes the device to:
obtain data files to be processed reported by a network element device; assign the data files to be processed into a plurality of tasks; add the plurality of tasks into a task queue, and extract tasks from the task queue one by one for processing;
wherein the instructions cause the device to assign the data files to be processed into the plurality of tasks by way of the following manner:
evaluating a total quantity or capacity of the data files to be processed;
evaluating local calculation ability;
obtaining local configuration parameters;
calculating task payload of each thread according to the quantity or capacity of the data files to be processed, the local calculation ability and the configuration parameter; and
assigning the data files to be processed as the plurality of tasks based on the task payload;
wherein the local calculation ability comprises: local CPU processing speed and memory capacity, and the configuration parameter comprises: a number of threads and maximum activation time of the threads;

wherein the task payload of each thread is equal to the total data quantity or capacity divided by a number of processing batch and then divided by the number of threads;

wherein the number of processing batch=Max (the total data CPU processing time/(the number of threads*the maximum activation time), the total capacity of the data/memory capacity), wherein, Max represents to take a maximum;

wherein the total data CPU processing time is equal to the total quantity or total capacity of the data files to be processed divided by the CPU processing speed.

3. The method as claimed in claim 1, wherein contents of each task are parsing data files under the leaf directories covered by each task.

4. The device as claimed in claim 2, wherein contents of each task are parsing data files under the leaf directories covered by each task.

* * * * *